United States Patent [19]

Tsuchiya et al.

[11] Patent Number: 5,172,250
[45] Date of Patent: Dec. 15, 1992

[54] HOLOGRAM SCALE HAVING MOISTURE RESISTANCE

[75] Inventors: Hideki Tsuchiya, Kanagawa; Kenichi Sato, Tokyo; Hiroyuki Ohkubo, Chiba, all of Japan

[73] Assignee: Sony Magnescale, Inc., Japan

[21] Appl. No.: 486,314

[22] Filed: Feb. 28, 1990

[30] Foreign Application Priority Data

Feb. 28, 1989 [JP] Japan .................................. 1-47901
Oct. 26, 1989 [JP] Japan .................................. 1-279317

[51] Int. Cl.$^5$ .......................... G02B 5/18; G02B 5/32; G03H 1/02
[52] U.S. Cl. .......................................... 359/1; 359/15; 359/566
[58] Field of Search ................ 350/3.6, 3.61; 430/1, 430/2; 356/347; 359/1, 3, 15, 558, 566

[56] References Cited

U.S. PATENT DOCUMENTS

| | | | |
|---|---|---|---|
| 4,179,182 | 12/1979 | Smith | 350/3.6 |
| 4,330,604 | 5/1982 | Wreede et al. | 350/3.6 |
| 4,789,211 | 12/1988 | Wreede | 350/3.61 |
| 4,871,411 | 10/1989 | Kushibiki et al. | 350/3.61 |
| 4,908,285 | 3/1990 | Kushibiki et al. | 350/3.61 |
| 4,913,990 | 4/1990 | Rallison | 350/3.61 |
| 4,946,533 | 8/1990 | Kushibiki et al. | 350/3.61 |

FOREIGN PATENT DOCUMENTS

| | | |
|---|---|---|
| 57-146283 | 9/1982 | Japan . |
| 59-201080 | 11/1984 | Japan . |
| 59-201081 | 11/1984 | Japan . |
| 60-227221 | 11/1985 | Japan . |
| 61-6681 | 1/1986 | Japan . |
| 61-14620 | 1/1986 | Japan . |
| 61-284789 | 12/1986 | Japan . |
| 62-32485 | 2/1987 | Japan . |
| 62-63981 | 3/1987 | Japan . |

Primary Examiner—Bruce Y. Arnold
Assistant Examiner—Martin Lerner
Attorney, Agent, or Firm—Ronald P. Kananen

[57] ABSTRACT

A hologram scale having a base substrate, a hologram film with a diffraction grating of a desired pitch exposed thereon, adhered to the base substrate, and with a protective substrate to protect the hologram film is manufactured by the following method: a hologram of a laser produced diffraction grating is formed on a holographic film to act as a scale. This film is applied on a central portion of a base substrate. Adhesives having moisture resistance are applied between the base and the protective substrates to essentially surround the hologram film positioned on the base substrate. The protective and the base substrates are sealed integrally by the adhesives, securing the hologram film therein so as to protect it from ambient environmental conditions.

7 Claims, 7 Drawing Sheets

HOLOGRAM SCALE HAVING MOISTURE RESISTANCE

BACKGROUND OF THE INVENTION

1. Field of the Invention

This invention relates to a hologram scale for measuring relative displacement quantities between two relatively displaceable mechanical components. More specifically, it relates to a hologram scale mounted on a linear encoder having high resolution.

2. Description of the Prior Art

Optical scales for measuring relative displacement quantities between two mechanical components have been generally known as metallic pattern scales which are made by the method of applying photoresists on the surface of a metallic substrate glass scale, then projecting patterns having desired pitches by a continuous step and repeat method, and after projection, supplying a development treatment or etching for the glass scale. These metallic scales have pitches on an order of 10 microns.

Recently however, processing accuracy on the order of 0.1 microns has been required for some applications, such as when processing spindles for video tape recorders. Therefore, conventional metallic scales are not sufficient as a displacement measuring system.

Figure 6:
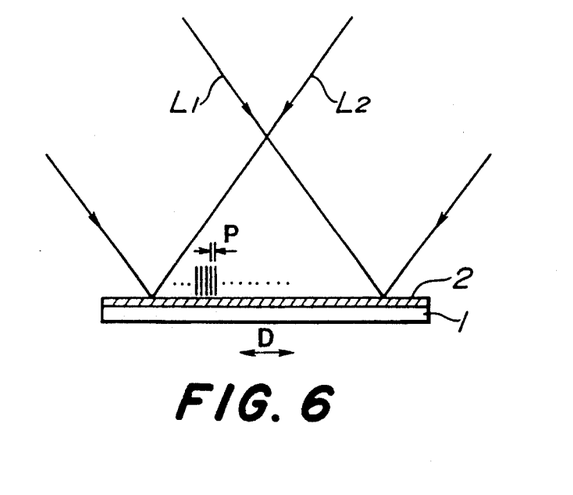
FIG. 6 is a line view showing a general principle of holography.

In order to solve the above problem, holographic techniques have been applied in this field. A typical process for producing a hologram scale is shown in FIG. 6. The surface of a base substrate 1, essentially a glass substrate, is adhered to a hologram film 2 formed by an emulsion of silver salts, dichromated gelatin (DCG) or the like. Laser beams $L_1$ and $L_2$ which are parallelized laser beams having specified wavelength $\lambda$ are irradiated so as to intersect at a desired angle which causes interference fringes to be formed at regular pitches P. These pitches, caused by the intersection of lasers $L_1$ and $L_2$ are transferred to the hologram film 2 directly. Then, if silver salts are used for emulsion of the hologram film 2, development and bleaching are performed so that the interference fringes are fixed, forming a scale with the pitches P as its unit of measure (a kind of diffraction grating). This diffraction grating may be considered as phase type hologram or volume type hologram. The pitches P of the hologram scale can be practically formed at intervals of 0.5 microns, so a resolution of twenty times that of conventional metallic pattern scales can be achieved.

To further improve processing accuracy, linear encoders having high resolutions are desired. Hologram scales as aforementioned are utilized for such linear encoders, which have strict accuracy and resolution requirements.

However, generally, holograms formed on such as a glass scale are strongly affected by humidity. For example, when a glass scale is exposed to temperatures of 30° C. or so, and a humidity of about 60% RH for extended periods, the scale, depending on differences in the refractive index of a hologram, becomes unreadable and cannot be used as a scale. Therefore, sealed holograms have been required to increase moisture resistance.

Figure 8:
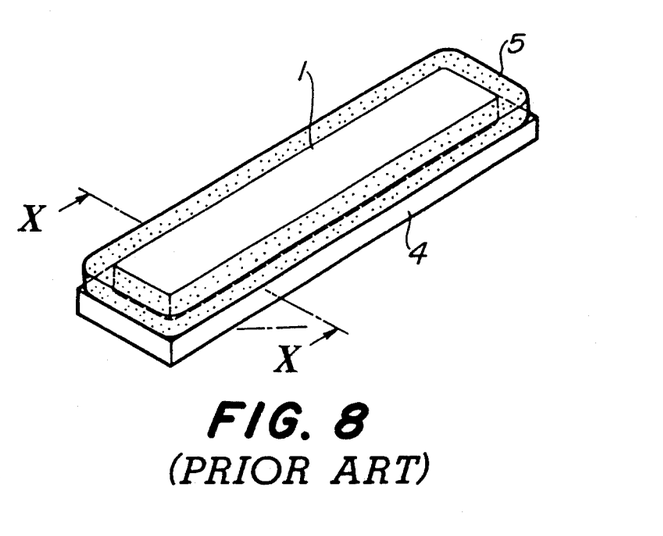
FIG. 8 is a perspective view of a hologram scale according to a prior art invention.
Figure 9:
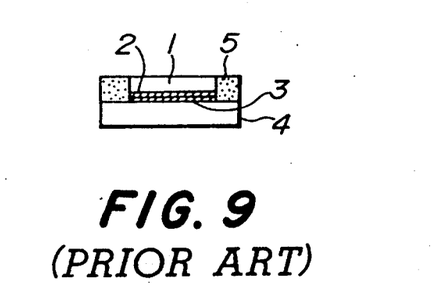
FIG. 9 is a sectional view taken along line X—X of FIG. 11, FIGS. 10, 11, 12 and 13 are sectional views of a hologram scale according to other prior art inventions.

Japanese Patent First Publication (Tokkai) No. 62-32485 discloses a hologram scale as shown in FIGS. 8 and 9. A surface of a glass base substrate 1, with a hologram film 2 adhered, is fixed to a cover substrate 4, which widely surrounds the hologram, for protection and fixed to the glass base substrate by light transmitting adhesives 3. The width of the base substrate 1 is generally narrower than that of the cover substrate 4, and this difference in width is made up by an adhesive composed of epoxy resins (EP) which substantially surround the base substrate 1 and effectively bonds it to the cover substrate 4. According to this prior art, as shown in FIG. 9, the hologram film 2 can substantially be sealed from ambient air by adhesives 5, so that the moisture resistance of the hologram film 2 can be improved. However, in this type of hologram scale, the linear expansion coefficients of the adhesive 5, the cover substrate 4 and the base substrate 1 are different so that curvature of the scale per se is caused when the scale faces high temperatures, and peeling of the base substrate 1 is caused when the scale faces low temperatures. Additionally, the aforementioned type of the scale is of complex structure and maufacture of such a scale takes a long time because the process for forming this comprises two steps using two adhesives 3, and 5.

Figure 10:
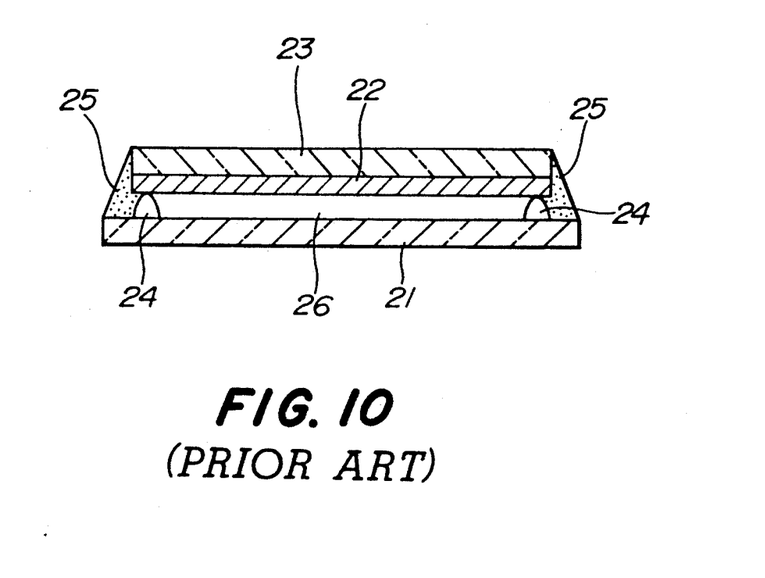
Figure 11:
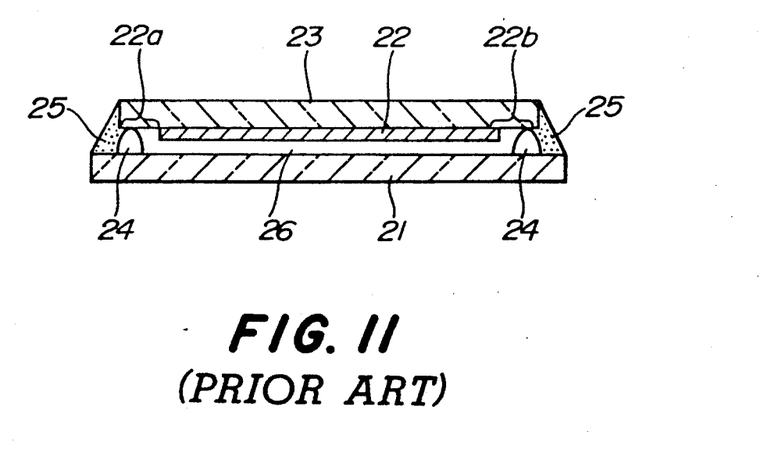

Japanese Patent First Publication (Tokkai) No. 57-146283 discloses a sealing means for a hologram as shown in FIG. 10. In FIG. 10, a hologram film 22 is adhered to a glass substrate 23 and a protective glass substrate 21 is fitted therebelow via spacers 24. The outer sides of the spacers 24 are sealed by adhesives 25. A cavity 26 is defined by the hologram film 22 and the protective glass substrate 21 which is sealed facing each other by adhesives 25, and in this cavity 26, dry air is trapped. According to this structure, deterioration of the hologram can be prevented because the hologram film 22 is exposed to an environment having relatively low humidity. Alternatively, a modified embodiment of the seal means for the hologram of FIG. 10 is shown in FIG. 11. In this case, parts of a hologram film 22a and 22b are removed, then the ends of the spacers 24 come in direct contact with the glass substrate 23. According to this modification, the adhesive strength of the adhesives 25 can be increased because, since hologram films are often formed of gelatin etc. and do not provide a strong bond with adhesives, the spacers 24 and adhesives 25 do not directly contact the hologram film 2.

Figure 12:
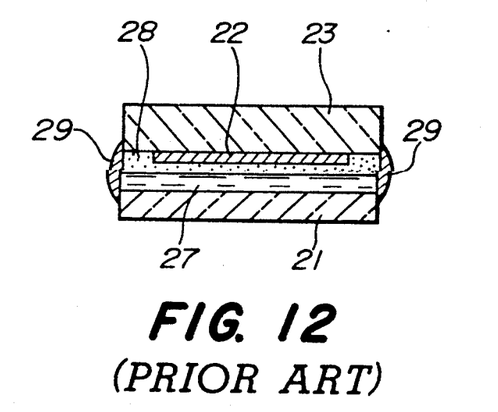
Figure 13:
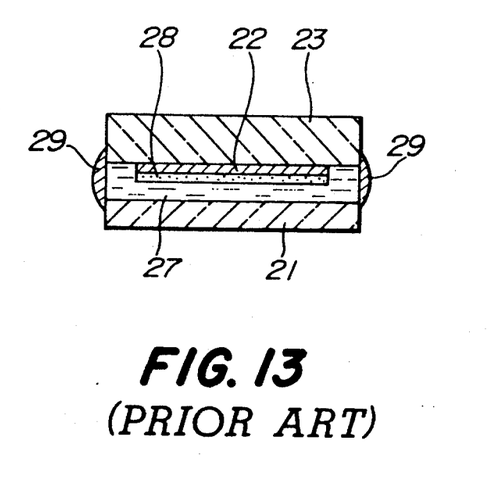

Another sealing means for a hologram is disclosed in Japanese Patent First Publication (Tokkai) No. 61-6681 as shown in FIG. 12. Referring now to FIG. 12 whose reference numerals are similar to FIG. 10, on a surface of a hologram film 22 adhered to a glass substrate 23, a protective glass substrate 21 is adhered through a first resin layer 27 and a second resin layer 28. The first and second resin layers 27, 28 are peripherally sealed with a sealing material 29. According to this disclosure, deterioration of the hologram can be prevented because the hologram film 22 is sealed from ambient environmental conditions by the first and second resin layers 28 and the seal material 29. Alternatively, deterioration of the hologram can also be prevented if the second resin layer 28 is applied only directly over the surface of the hologram film 22 as shown in FIG. 13.

However, In the previously described process in which dry air etc. is trapped in a cavity 26 within the scale, manufacture of the hologram scale is complicated and expensive. Additionally, the refractive index of the cavity 26 is greatly different from that of the protective glass substrate 23, furthermore, maintaining a uniform thickness of the cavity 26 is very difficult and so the diffraction efficiency of the hologram film 22 is compromised and becomes nonuniform, thus the accuracy of the hologram as a linear encoder tends to deteriorate.

On the other hand, in the case of coating a hologram film 22 with resin layers 27 and 28, as described above, the dispersion of the resins is difficult to maintain at a constant thickness, therefore the diffraction efficiency of the hologram film 22 is compromised and becomes unsuitable as a linear encoder. Furthermore, bubbles tend to contaminate the resins 27, 28, therefore, diffracted light from the hologram film 22 causes high turbulence, so accurate position signals cannot be obtained when the hologram is assembled as a linear encoder.

Furthermore, in the case of using a seal material 29 as a molding around the periphery of a glass substrate 23 on which a hologram film 22 is adhered with a protective glass substrate 21 further adhered thereon through relatively thick resins, the thermal expansion coefficients among the resins, the protective glass substrate 21 and the glass substrate 23 are quite different. Therefore, according to alterations in ambient temperature, curvature is caused in the seal of hologram assembly, and moreover, peeling of the interface portions of the hologram film 22 is caused by strain to the glass substrate 23 due to these conditions.

SUMMARY OF THE INVENTION

A principle object of the present invention is to provide an improved hologram scale which has a simpler and more completely moisture proof structure in order to protect a hologram film, and peeling resistance in environments in which the temperature changes greatly.

It is another object of the present invention to provide a hologram scale having a uniform space between a hologram film and a protective substrate, utilizing adhesives having a thin film structure applied between a base substrate upon which a hologram film is adhered and a protective substrate.

It is a further object of the present invention to provide a hologram scale having a long life.

It is a still further object of the present invention to provide a method for easy mass-production of such a hologram scale.

A hologram scale according to the invention, having a base substrate, a hologram film with a diffraction grating exposed thereon adhered to the base substrate, and a protective substrate is manufactured by the following method.

Holographic film is applied so as to cover the whole surface of a base substrate, then a hologram is formed on it by exposing it to a laser beam. The exposed hologram film is developed, fixed and bleached. Portions of said hologram film are removed to leave only a central portion of it remaining. At this stage, the unwanted portions of the hologram film may be removed by using chemical, electronic and/or mechanical techniques, and the hologram film is adhered to the base substrate by techniques well known in the art.

Alternatively, the hologram film may be applied to only the central portion of the base substrate in the first place or, masking techniques may be applied to prevent adhesion of the holographic film in other than a desired location.

After the hologram film is formed, adhesives having sealant properties with moisture resistance are applied to the stripped surface of a base substrate, then, the protective substrate is pressed to the surface of the base substrate, with the protective substrate and the base substrate essentially sealing the hologram film therebetween. Light-transmitting adhesives having sealant properties being preferably used between the base substrate and the protective substrate.

Non light-transmitting adhesives having sealant properties may also be utilized between the base substrate and the protective substrate, for the peripheral sides of the hologram film. According to this construction the hologram film is peripherally surrounded by the adhesives, while the top surface of it directly contacts the protective substrate.

The adhesives having sealant properties are selected from groups of adhesives having a diffusion coefficient D of less than $6 \times 10^{-7}$ at 60° C. in 90% RH atmosphere, according to Fick's diffusion formula. Fick's diffusion formula is already known and is as follows, $$Mt/M\infty = \frac{4/b}{(D/\pi)^2 t^2}$$

wherein
$Mt = (Wt - Wo)/Wo \times 100$
Wo: dried weight of sample
Wt: sample weight after absorbing moisture in a predetermined atmosphere after t days,
$M\infty$: Percentage of balanced absorption,
D: Diffusion coefficient,
b: Sample thickness,
t: time (days).

The adhesives may be selected from groups having a refractive index relatively similar to glass, and may be acrylic resins, and/or epoxy resins having light transmitting properties when the hologram film is substantially surrounded by the adhesives. The thickness of the base substrate and the protective substrate are in the range of about 2 to 3 mm, more preferably, about 2.3 mm, respectively. The thickness of the adhesives is determined about 10 μm. It may also be determined so as to equal the thickness of the hologram film, which is about 6 μm. The pitch of the diffraction grating of the hologram film is determined at about 0.5 μm.

The base substrate may preferably be extended beyond the dimensions required for the hologram scale in a direction parallel to the pitch of the diffraction grating for use as a guiding line. Alternatively either the base of protective substrates may be extended in any desired direction to facilitate a variety of mounting requirements.

BRIEF DESCRIPTION OF THE DRAWINGS

The present invention will be understood more fully from the detailed description given herebelow and from the accompanying drawings of the preferred embodiments of the present invention, which, however, should not be taken to limit the invention to the specific embodiments, but are for explanation and understanding only. In the drawings.

DETAILED DESCRIPTION OF THE PREFERRED EMBODIMENTS

Figure 1:
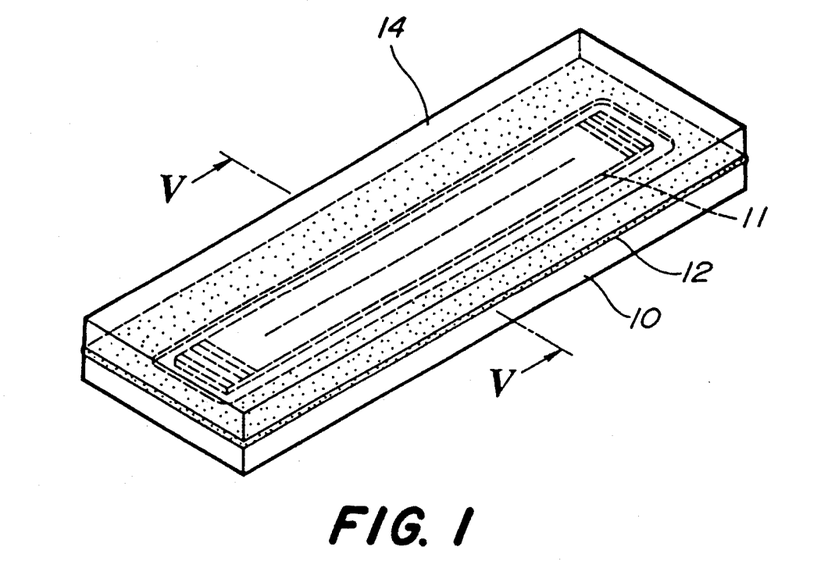
FIG. 1 is a perspective view of a second embodiment according to the present invention.
Figure 2:
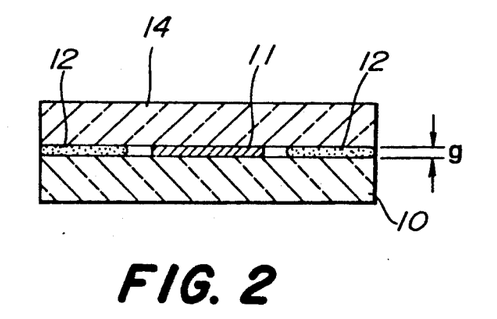
FIG. 2 is an enlarged sectional view taken along line V—V of FIG. 1.

FIGS. 1 to 2 show an embodiment of the present invention. A hologram film 11 is formed of a photo-sensitive material of, for example, silver salts and is adhered to the center of a base substrate 10. A hologram is formed by transferring an interference fringe of a desired pitch (for example, about 0.5 $\mu$m) from intersecting laser beams to the hologram film 11. Adhesives 12 having sealant properties are applied to the base substrate 10 in an area surrounding, but not contacting, the hologram film 11. The base substrate 10 is adhered to the protective substrate 12 directly by pressing the adhesive-coated surface of the base substrate 10 against the protective substrate 14, thus trapping the hologram film 11 securely therein, the face thereof directly contacting the inner surface of the protective substrate. Here, adhesives can be used which have light transmitting properties. For example, 3101 (a registered trademark of Three Bond Co., Ltd.), KV-480, KW-450, KS-420 (these adhesives are registered trademarks of Toyobo Co., Ltd.), and 301-2 (a registered trademark of Epoxy Technology Inc.) are preferable.

Figure 7:
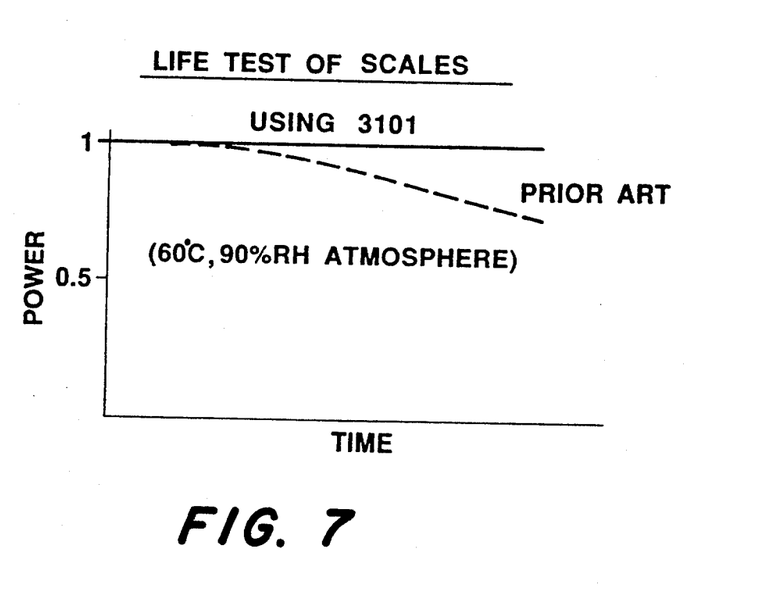
FIG. 7 is a graph of Life-tests showing the relationship between time and the adhesive power of various adhesives.

Life-tests were performed for scales using 3101 adhesive as well as for scales using adhesives as in the prior art. The results of the tests are shown in FIG. 7. As shown by FIG. 7, a hologram scale using adhesive 3101 indicates long life and its adhesive power was maintained over long periods, while a hologram scale of the prior art aged speedily and the adhesive power of its adhesive weakened considerably sooner.

Alternatively adhesives having no light transmitting properties may also be used as the sealant adhesive 12, so epoxy resin adhesives (of the generally used type) can be used in this embodiment. Epoxy resin adhesives have greater moisture resistance than acrylic resin adhesives which have excellent light transmittance. For example, adhesives such as 2003 (a resistered trademark of Three Bond Co., Ltd.), TORR SEAL (a resistered trademark of VARIAN Associates.) are preferable.

As shown in FIG. 2, in this embodiment, the thickness of the base substrate 10 and the protective substrate 14 are each about 2.3 $\mu$m, and the thickness of the hologram film 11 is about 6 $\mu$m. Therefore, thickness of the sealant adhesive 12 between the base substrate 10 and the protective substrate 14 is also about 6 $\mu$m.

Figure 3:
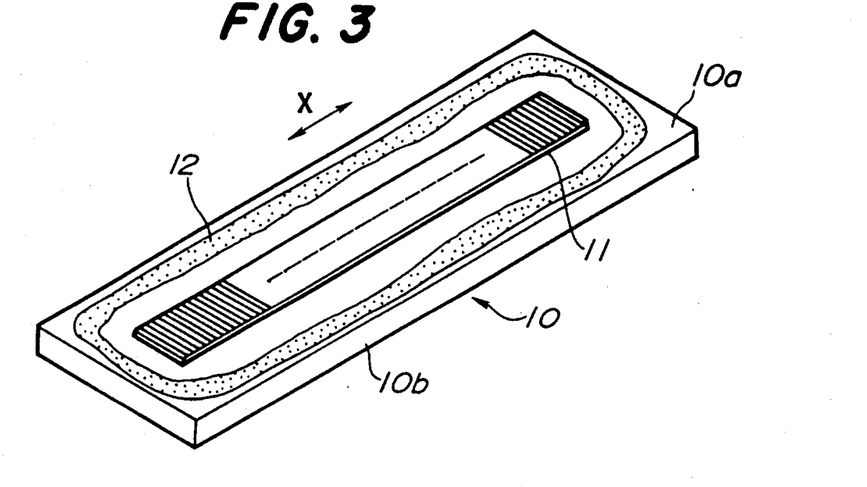
FIG. 3 is a perspective view of a manufacturing stage of a hologram scale according to the second embodiment.

Referring now to FIG. 3, the method for manufacturing the hologram scale of this embodiment comprises the steps as follows: The hologram film 11 is uniformly applied to the whole surface 10a of the base substrate 10. Interference fringes produced by laser beams are exposed on the hologram film 11, developed, fixed and bleached. As a reaults, a phase type hologram having good diffraction efficiency is obtained. In this hologram, a scale having a desired pitch is formed in a lengthwise direction (the direction of line X in FIG. 3) of the hologram film. Next, the portion of the hologram film 11 covering the peripheral area of the base substrate 10 is removed chemically, electronically or mechanically, the hologram film 11 remaining only in the central portion of the surface 10a of the base substrate 10. Alternatively, at this stage, the hologram film 11 may be applied as required, to only the central portion of the base substrate 10. The hologram scale of this embodiment is completed by pressing the protective substrate 14 onto the surface 10a of the base substrate 10 after applying a sealant adhesive 12 to the portions of the base substrate 10 surrounding the remaining hologram film 11.

According to the hologram scale construction of this embodiment, nonuniformity of the diffraction efficiency of the hologram film 11 can be avoided, because the clearance gap between the hologram film 11 and the protective substrate 14 is essentially nothing, and since no adhesive is applied on the surface of the hologram film 11, no bubbles will form which could contaminate the surface of the hologram film 11. Therefore, the accuracy of measuring will not deteriorate when the hologram scale is set in a linear encorder.

Additionally, curvature of the hologram scale which caused by differences among the linear expansion coefficients of the sealant adhesives 12, the substrates 10 and 14 are effectively eliminated because the thickness of the sealant adhesives 12 are essentially the same as the thickness of the hologram film 11.

Furthermore, according to this embodiment, the structure is very simple, therefore, manufacturing costs can be reduced.

Moreover, the selection of suitable adhesives, such as epoxy resins having good moisture resistance and good adhesive strength, can be accomplished more freely, since the sealant adhesives 12 of this embodiment are not limited to the light transmittant adhesives.

Figure 4:
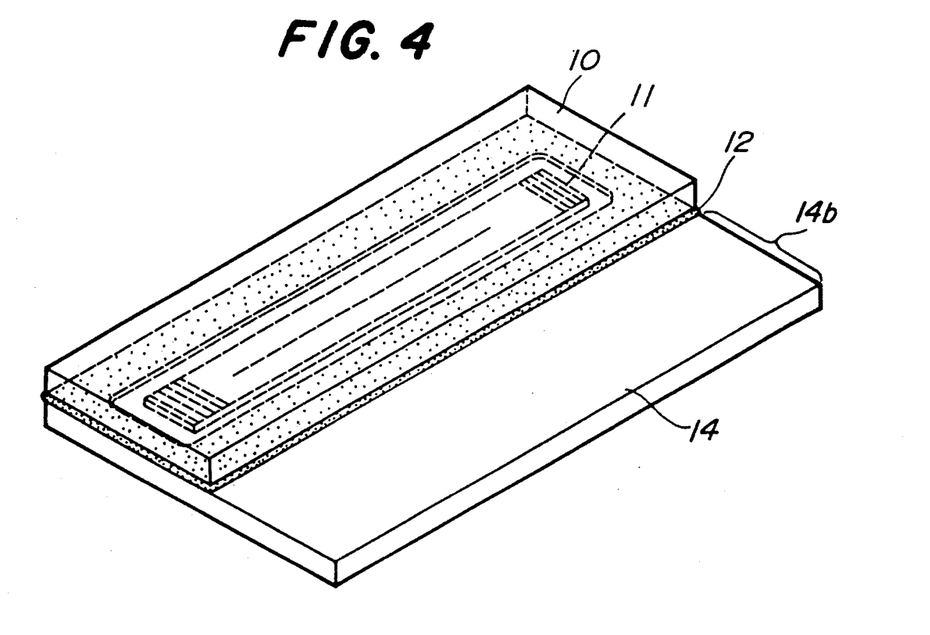
FIG. 4 is a perspective view of a modified embodiment of FIG. 1 according to the present invention.

FIG. 14 shows a modification of the embodiment of FIGS. 1 to 3. Like reference numerals indicate like members, corresponding to those shown in FIG. 1. In this modified embodiment, the width of the protective substrate 14 is wider than the width of the base substrate 10. Otherwise, the structure of the scale is similar to the embodiment shown in FIG. 1. As shown in FIG. 4, an offset portion 14b of the protective substrate 14 which extends longer than the base substrate 10 can be used as a guiding line when the hologram scale is fixed.

Figure 5:
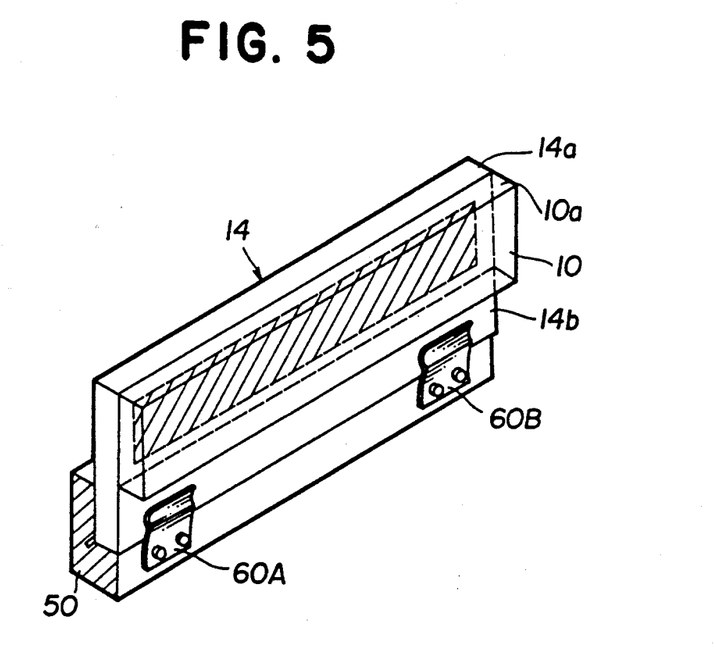
FIG. 5 is a perspective view of a modified embodiment of FIG. 1 according to the present invention.

FIG. 5 shows fixing of the hologram scale as aforementioned. Referring now to FIG. 5, the width of a protective substrate 14 is determined to be larger than width of a base substrate 10. Then, an offset portion 14a of the protective substrate 14 is mounted on a slider 50. The protective substrate 14 is fixed to the slider 50 in the lengthwise direction by fixing means such as flat springs 60A and/or 60B. The slider 50 is mounted on one of two relatively displaceable mechanical components, and a detecting element for the hologram scale is mounted on the other component. The position of the detecting element may be determined by an edge 14a of the protective substrate 14 utilized as a guiding line. However, in this case, an edge 10a of the base substrate 10 is not to be projected beyond the edge 14a of the protective substrate 14.

According to this embodiment of the present invention, the protective substrate 14 can not only be used as the protective component but as the fixing component of the hologram scale per se. Therefore, the scale of this embodiment can be mounted easily to the component such as the slider 50 in spite of its simple structure.

Furthermore, in the embodiment shown in FIG. 1, dimensions of the protective substrate 14 may be determined to be smaller than dimensions of the base substrate 10. Additionally, the base substrate may be enlarged to allow for a fixing structure, essentially opposite to the construction described above. However, in all cases the area of the smaller of the substrate must be determined having at least an area to substantially cover the hologram film 11 of the base substrate 10.

Although the present invention has been shown and described with respect to detailed embodiments thereof, it should be understood by those skilled in the art that various changes in form and detail thereof may be be made without departing from the spirit and scope of the appended claims, for example, the base substrate 10 may be made larger than the protective substrate 14, and/or sensitizing materials other than silver salts may be used in the manufacture of the hologram film 11.

What is claimed is:

1. A hologram scale comprises:
   a base substrate,
   a hologram film having a diffraction grating of a desired pitch, wherein said hologram film is applied on said base substrate,
   a protective substrate applied on said hologram film, and
   a moisture resistive layer extending along the periphery of said hologram film and substantially surrounding said hologram film so as to bond said base substrate and said protective substrate, holding said hologram film therebetween, wherein said film contacts directly with the respective faced surfaces of the substrates.

2. The hologram scale as set forth in claim 1, wherein said moisture resistive layer is established by using adhesives which are selected from light-transmitting adhesives having moisture resistance.

3. The hologram scale as set forth in claim 2, wherein said adhesives are selected from the groups consisting of acrylic resins and epoxy resins.

4. The hologram scale as set forth in claim 1, wherein said moisture resistive layer is established by using adhesives which are selected from non light-transmitting adhesives having moisture resistance.

5. The hologram scale as set forth in claim 1, wherein said protective substrate is extended in the direction transverse to the direction of the pitches of said diffraction grating to form a guiding line for fixing.

6. A hologram scale comprises:
   a base substrate,
   a hologram film having a diffraction grating of a desired pitch, wherein said hologram film is applied on said base substrate,
   a protective substrate applied on said hologram film, and
   a moisture resistive layer extending along the periphery of said hologram film and substantially surrounding said hologram film so as to bond said base substrate and said protective substrate, holding said hologram film therebetween, wherein said film contacts directly with the respective faced surfaces of the substrates
   wherein said moisture resistive layer is established by using adhesives having moisture resistance which are selected from the groups of adhesives having a diffusion coefficient D, at 60° C. in 90% RH atmosphere, of less than $6 \times 10^{-7}$, according to Fick's diffusion formula.

7. A hologram scale comprises:
   a base substrate,
   a hologram film having a diffraction grating of a desired pitch, wherein said hologram film is applied on said base substrate,
   a protective substrate applied on said hologram film, and
   a moisture resistive layer extending along the periphery of said hologram film and substantially surrounding said hologram film so as to bond said base substrate and said protective substrate, holding said hologram film therebetween, wherein said film contacts directly with the respective faced surfaces of the substrates,
   wherein said moisture resistive layer is established by using adhesives having moisture resistance which are selected from the groups of adhesives having a diffusion coefficient D, at 60° C. in 90% RH atmosphere, of less than $6 \times 10^{31\ 7}$, according to Fick's diffusion formula,
   wherein said adhesives are selected from the groups of adhesives which have a refractive index relatively similar to glass.

\* \* \* \* \*